Oct. 22, 1963
V. K. PELTOLA
3,108,221
EDDY CURRENT TACHOMETER INDICATOR ASSEMBLY FOR
INDICATING REVOLUTIONS PER MINUTE
Filed Oct. 16, 1961
3 Sheets-Sheet 1
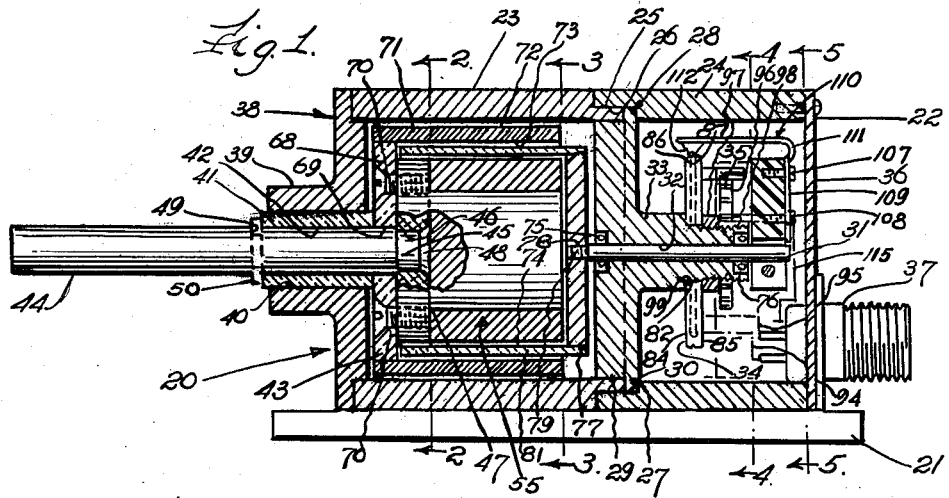
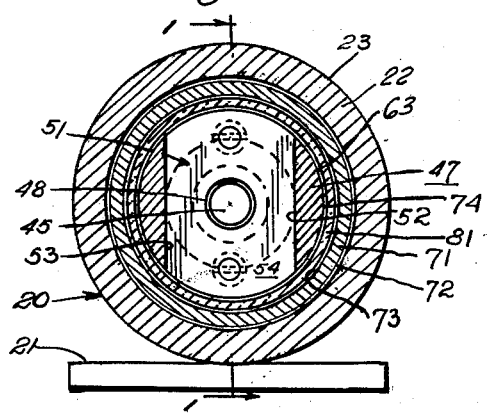
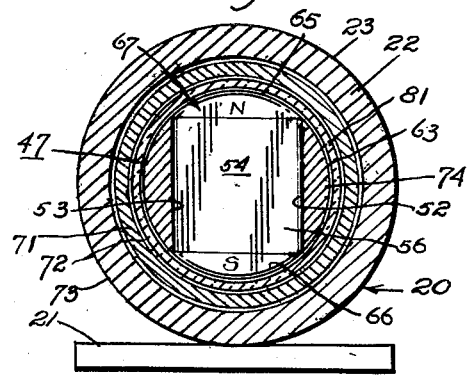
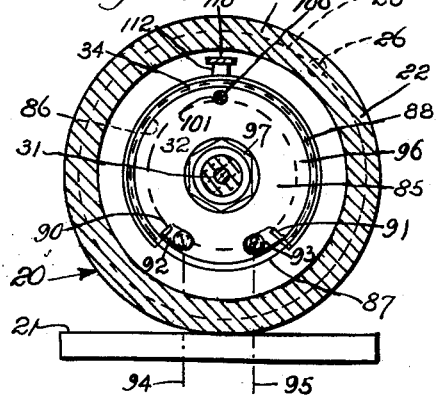
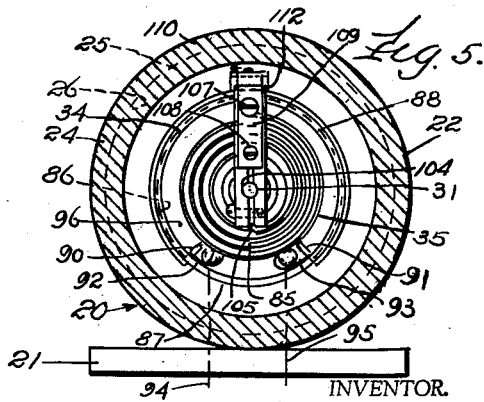
INVENTOR.
VEIKKO K. PELTOLA
BY Robert H. Wendt
Attorney.

Oct. 22, 1963  V. K. PELTOLA  3,108,221
EDDY CURRENT TACHOMETER INDICATOR ASSEMBLY FOR
INDICATING REVOLUTIONS PER MINUTE
Filed Oct. 16, 1961  3 Sheets-Sheet 2
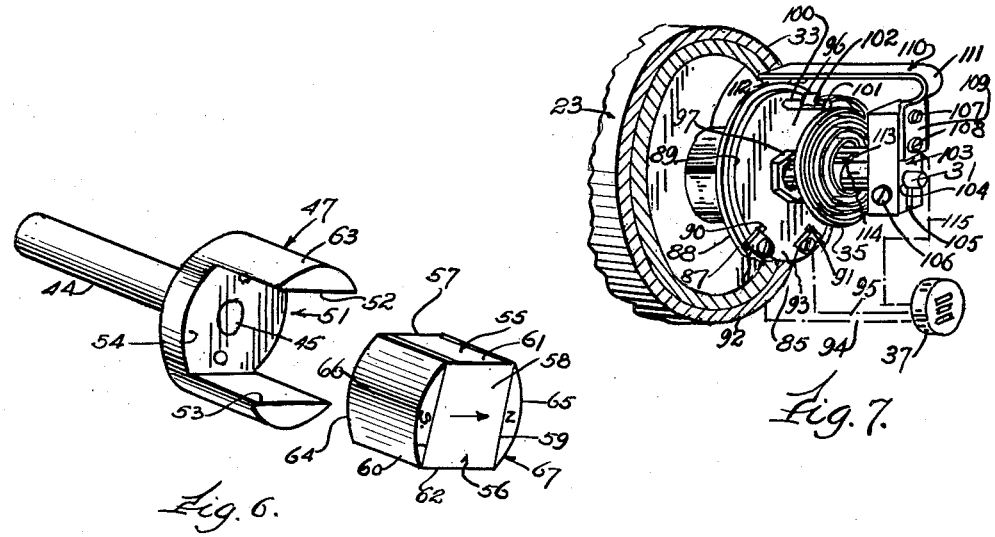
Fig. 6.
Fig. 7.
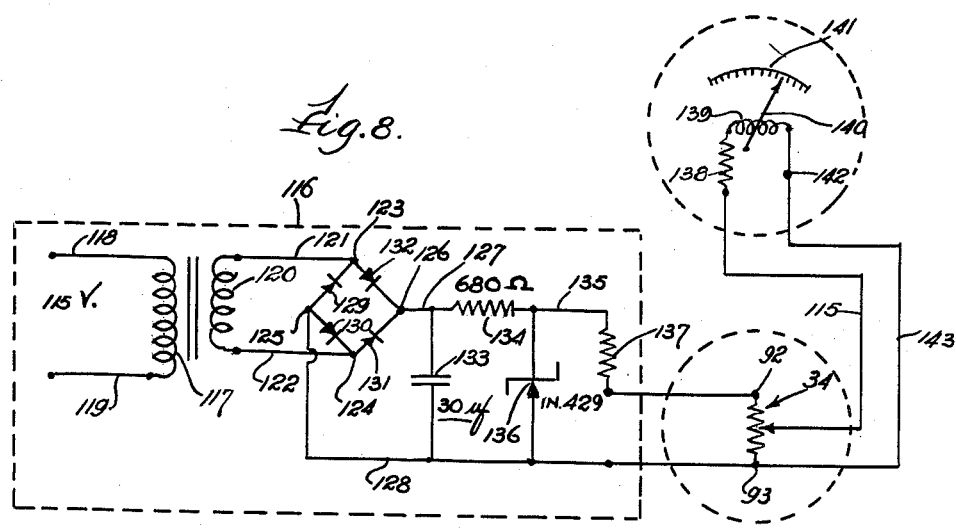
Fig. 8.
INVENTOR.
VEIKKO K. PELTOLA,
BY Robert H Wendt
Attorney.

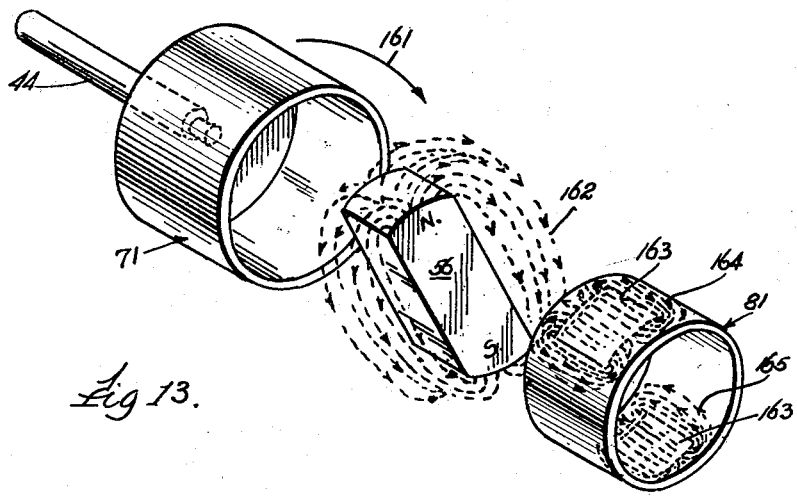
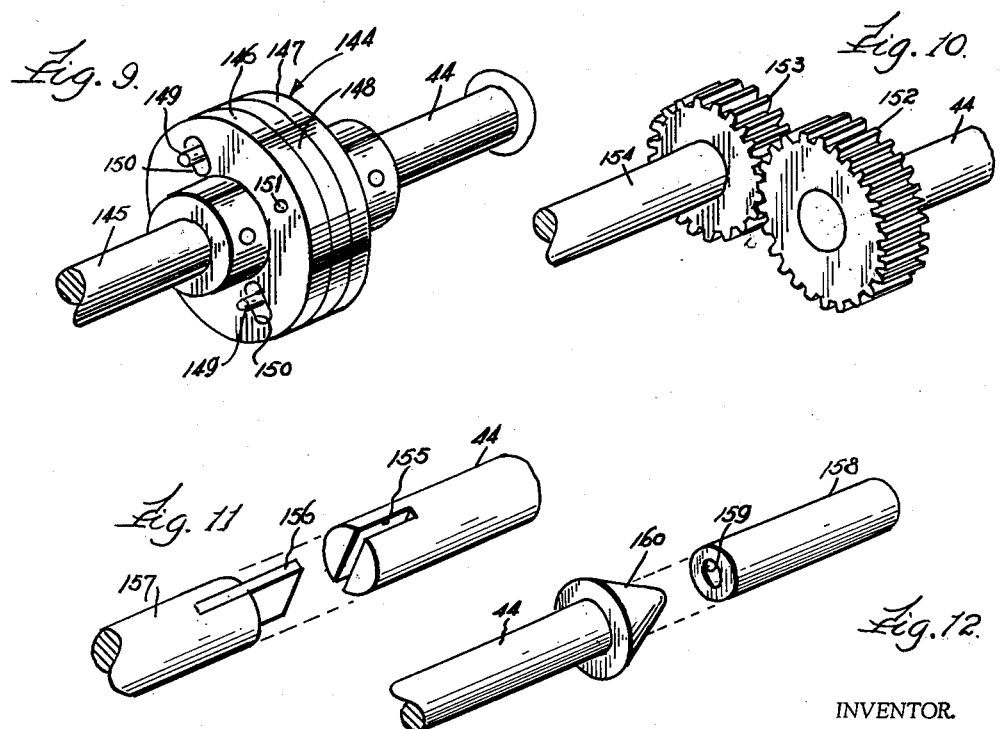

United States Patent Office 3,108,221
Patented Oct. 22, 1963

3,108,221
EDDY CURRENT TACHOMETER INDICATOR ASSEMBLY FOR INDICATING REVOLUTIONS PER MINUTE
Veikko K. Peltola, Chicago, Ill., assignor to Illinois Testing Laboratories, Inc., Chicago, Ill., a corporation of Illinois
Filed Oct. 16, 1961, Ser. No. 145,336
2 Claims. (Cl. 324—70)

The present invention relates to an eddy current tachometer indicator assembly for indicating revolutions per minute, and is particularly concerned with such a tachometer in which there is a rotating member which provides a rotating magnetic field and a second rotating member mounted in juxtaposition with said field to induce eddy currents that react with the magnetic field to produce a torque tending to rotate the second rotating member to a position which is dependent upon the speed of rotation of the magnetic field, and which may therefore indicate said speed.

Another object of the invention is the provision of a tachometer of the class described in which the starting torque required is at a minimum, the error due to friction is reduced as much as possible, the heat loss generated by the eddy currents is kept within practical limits, and the variations in the resistance of that part of the potentiometer in circuit are made to produce an indication without any jumps or steps.

Another object of the invention is the provision of a tachometer of the class described which is simple in construction, which has a minimum number of parts, which may be manufactured at a low cost, using components of lowest cost, and which is adapted to maintain its calibration and uniform indication for a long period of time without requiring repair or replacement of any of its parts.

Other objects and advantages of the invention will be apparent from the following description and the accompanying drawings, in which similar characters of reference indicate similar parts throughout the several views.

Referring to the drawings, of which there are three sheets,

FIG. 1 is an axial sectional view taken through the tachometer on the plane of the line 1—1 of FIG. 2, looking in the direction of the arrows;

FIG. 2 is a cross sectional view taken on the plane of the line 2—2 of FIG. 1, looking in the direction of the arrows;

FIG. 3 is a similar view taken on the plane of the line 3—3 of FIG. 1, looking in the direction of the arrows;

FIG. 4 is a similar view taken through the plane of the line 4—4 of FIG. 1, looking in the direction of the arrows;

FIG. 5 is a similar view taken on the plane of the line 5—5 of FIG. 1, looking in the direction of the arrows;

FIG. 6 is an exploded view in perspective of the magnet clamp and magnet;

FIG. 7 is a fragmentary view in perspective of the resistor, spring, and contact assembly;

FIG. 8 is a wiring diagram of the tachometer including its power supply and indicator;

FIG. 9 is a fragmentary view in perspective of one form of coupling which may be used between a rotating shaft, the speed of which is to be measured, and the tachometer shaft;

FIG. 10 is a similar view of another gear type coupling which may be employed;

FIG. 11 is a similar view of a key type coupling which may be used;

FIG. 12 is a similar view of a detachable form of coupling;

FIG. 13 is a diagrammatic view in perspective of the rotating parts, showing the approximate path of magnetic flux and the approximate path of eddy currents induced in a copper sleeve.

Referring to FIGS. 1–5, 20 indicates in its entirety the tachometer unit, which is preferably mounted upon a rectangular base plate 21 for holding it in a stable condition or mounting it on some machine having a shaft the speed of which is to be measured.

The base plate 21 supports a cylindrical housing 22, which may comprise a rotor housing 23 and a resistor housing 22, which may comprise a rotor housing 23 and a resistor housing 24; and these may be aluminum cylinders, each having a cylindrical bore, and each having plane ends, the rotor housing 23 having a portion of reduced diameter 25 fitting in an enlarged counterbore 26 in the resistor housing to form a continuous cylindrical housing with an annular grove 27 for receiving an intermediate partition 28.

The intermediate partition 28 comprises an aluminum disc having an outer cylindrical wall 29 fitting in the rotor housing 23 and having an annular flange 30 fitting in the groove 27. The partition 28 comprises a bearing support for a shaft 31, which is rotatably mounted in a cylindrical bore 32 in an axially extending hub 33 carried by the partition 28 and providing a mounting for a potentiometer 34 and for one end of a spiral spring 35.

The right end of the housing 22 may be closed by a circular cover plate 36 of aluminum secured by screw bolts passing through the cover and threaded into the housing 24. The cover 36 supports a connector fitting 37 for passing electrical conductors which are connected to the unit and to the energizing and indicating circuits shown in FIG. 8, further to be described.

The other end of the housing 22 is closed by means of a second aluminum end plate 38, forming a second bearing support, and provided with a central hub 39 and a cylindrical bore 40 for frictionally receiving a brass bearing sleeve 41 of cylindrical shape having a cylindrical bore 42 and having a pressed fit in the bore 40.

The bearing sleeve 41 projects toward the right from the bore 40 sufficiently to support the bronze washer 43; and the bearing sleeve 41 rotatably supports the rotor shaft 44, which comprises a cylindrical steel shaft having a reduced cylindrical end 45 that is mounted in a cylindrical bore 46 in a magnet clamp 47 in which it is secured by riveting at 48.

The shaft 44 may have a rectangular groove 49 containing a split ring 50 engaging the outer end of bearing 41, permitting the shaft to rotate in the bearing.

The magnet clamp 47 comprises a substantially cylindrical aluminum body carried by shaft 44 and having a rectangular recess 51 bounded by the upper and lower flat surfaces 52 and 53 and the flat end surface 54 for receiving the magnet assembly 55, which is fixedly clamped in the recess 51.

The magnet assembly comprises a rectangular block or permanent magnet 56 having plane ends 57, 58 and plane pole ends 59, 60 and plane sides 61, 62 adapted to fit in the recess 51 wherein it is frictionally secured or secured by means of suitable cement.

The outside of the magnet clamp has a cylindrical surface 63 which is a continuation of the cylindrical surfaces 64, 65 of a pair of soft iron pole shoes 66, 67 which are secured to the ends 59 and 60 of the permanent magnet.

The permanent magnet is preferably a member of Alnico or other magnetized material of high coercive force having north and south poles, as indicated by the letters N, S in FIG. 6. Thus the magnet assembly 55 is adapted to rotate with the shaft 44.

The shaft 44 also supports a circular brass end plate 68 having an aperture 69 for receiving shaft 44 and having a pair of apertures 70 for receiving screw bolts which secure the end plate 68 to the magnet clamp with which it rotates.

The end plate 68 supports a cylindrical pole shoe 71, comprising a cylinder of paramagnetic material, such as, for example, a tube of cold rolled steel which is provided with a press fit on the outside of end plate 68, and having an outer cylindrical surface 72 and an inner cylindrical surface 73.

The tube 71 forms an outer pole shoe completing the magnetic circuit from pole to pole of the magnet 56; and the inner cylindrical surface 73 of pole shoe 71 is spaced from the outer cylindrical surface 63 on the magnet clamp and the outer cylindrical surface 65 of the magnet pole pieces 66, 67, forming a cylindrical air gap 74, which is traversed by the magnetic flux from the poles of the magnet.

The outer cylindrical surface 72 of the sleeve 71 has a clearance with respect to the inside of the housing 23, as the sleeve 71 rotates with the end plate 68 and magnet, providing a clamp rotating magnetic structure and field with a cylindrical air gap.

The shaft 31, which is aligned with shaft 44, rotates in bore 32, which is provided with a miniature ball bearing assembly 75, 76 mounted frictionally in a cylindrical socket in each end of the hub 33.

Each ball bearing assembly may have an inner race, an outer race, and a plurality of balls mounted in the race grooves and adapted to permit rotation of shaft 31 with a minimum amount of friction. At its left end shaft 31 supports the armature end 77, comprising an aluminum disc having a threaded bore 78 for receiving the reduced threaded end 79 of shaft 31 on which the armature end is secured by threads and a nut in axial alignment at right angles to shaft 31.

The armature end 77 has an external cylindrical surface 80 which is adapted to have a pressed cylindrical fit inside an armature sleeve 81, comprising a cylindrical tube of copper which extends concentrically with respect to the shafts 44 and 31 and into the air gap 74, having an outer clearance with respect to the inner cylindrical surface 73 of the cylindrical pole shoe 71, and having a clearance with respect to the magnet pole pieces 66, 67 and a clearance at the end of the armature 81 with respect to the brass end plate 68. Thus the armature 81 rotates freely in the air gap 74.

The hub 33 has a reduced portion 82 for receiving a cylindrical aperture of the potentiometer, 34. The potentiometer 34 comprises a circular disc of laminated phenolic compound having flat sides 84 and 85 and a V slot 86 in its periphery 87.

The outer corners of the disc are tapered at 88, 89; and the V slot supports a resistance comprising a continuous round wire of resistance wire, such as Nichrome.

The potentiometer 34 comprises a circular wire which extends about the disc and is located in the V slot 86 and has both of its ends turned inwardly into radial slots 90, 91 in the disc. Each end of the wire has a metal connector 92, 93 clamped about the wire and soldered thereto and provided with a threaded screw bolt for securing the conductors 94, 95.

The laminated insulating disc 96 is clamped on the hub 33 by means of a threaded nut 97 which is threaded on the threaded portion 98 of the hub 33, securing the disc 96 against an annular shoulder 99.

The potentiometer disc 96 has a stud 100 secured to it near its periphery; and the stud is provided with an axially extending slot 101 for receiving the outwardly turned end 102 of a spiral spring 35.

The shaft 31 also supports an insulating contact block 103 having an aperture 104 and a slot 105. The slot 105 is traversed by a screw bolt 106 having a nut for clamping the block 103 on the shaft 31. The block 103 has a pair of threaded bores for receiving screw bolts 107 and 108, which pass through the attaching flange 109 of the contact arm 110.

The contact arm is thus secured to the block and is laterally bent at 111 and provided with a rounded contact 112 bearing on the Nichrome wire of the potentiometer 34.

The screw 108 in block 103 is extended to the left in FIG. 7 and provided with a slot 113 for receiving and securing the backwardly turned end 114 at the inner end of the spiral spring 35.

The zero position of the potentiometer and the spring tension may be adjusted by rotating the bolt 108 and securing it in adjusted position by means of a lock nut. A conductor 115 may extend from the attaching flange 109 of the contact arm to the connector fitting 37. Thus the armature 81 is adapted to rotate the shaft 31 and with it the block 103 and the contact arm 110.

Thus the contact 112 slides along the potentiometer wire 34 and also establishes an intermediate connection to it, the connectors 92 and 93 establishing connections at both ends of the potentiometer.

Referring to FIG. 8, this is a wiring diagram for the tachometer, which is provided with a D.C. power supply, indicated at 116, for energizing the circuits. The potentiometer is indicated at 34 and the ends of the potentiometer at 92 and 93.

The power supply is adapted to have its transformer primary 117 connected to the 115 volt 60 cycle at terminals 118, 119. The secondary of the transformer is indicated at 120; and its terminals are connected by conductors 121, 122 to terminals 123, 124 of a rectifier bridge.

The rectifier bridge has terminals 125 and 126 connected to conductors 127 and 128. The rectifier bridge has four rectifiers, indicated at 129, 130, 131, and 132, connected so that the alternating current is rectified to direct current in coductors 127, 128. The conductors 127, 128 are bridged by a condenser 133, such as, for example, thirty microfarads, for absorbing the alternating components.

134 indicates a resistor in conductor 127, such as, for example, 680 ohms; and beyond this resistor conductor 135 and conductor 128 are bridged by a diode 136, such as IN429.

The conductor 135 is connected through resistor 137 to terminal 92; and conductor 128 is connected to terminal 93. By means of this power supply, energized by ordinary lighting current, a constant direct current voltage is applied to the terminals of the potentiometer 34.

The conductor 115 from the contact arm 110 is connected through a resistor 138 to the coil 139 of a direct current galvanometer having a pointer 140 moving over a scale 141 calibrated in revolutions per minute. The other terminal 142 of the galvanometer is connected by conductor 143 to terminal 93 of the potentiometer.

Referring to FIG. 9, this is a fragmentary view in perspective showing one form of universal coupling, indicated in its entirety by 144, for connecting a driven shaft 145 to the shaft 44 of the tachometer.

The universal coupling 144 comprises a pair of metal plates 146, 147 separated by rubber 148 and connected by pins 149 carried by plate 147 passing through the rubber 148 and located in radial slots 150 in the plate 146. Similar pins 151 carried by plate 146 extend to similar slots in plate 147.

By this arrangement shaft 44 of the tachometer is driven at the same speed as the shaft 145, the speed of which is to be measured.

FIG. 10 shows a modification of the driving coupling in which the shaft 44 is provided with a gear 152 which is driven by gear 153 carried by shaft 154, the speed of which is to be measured.

In FIG. 11 this is a modified form of coupling in which the shaft 44 has been provided with an axial parallel walled slot 155 for receiving a flat key 156 carried by shaft 157, the speed of which is to be measured.

Referring to FIG. 12, the rotating shaft here is indicated at 158, the speed of which is to be measured; and it is provided with a tapered bore 159 in its end to be engaged by the rubber conical tip 160, which is mounted on the shaft 44 of a portable tachometer.

Referring to FIG. 13, this is a fragmentary diagram showing the rotating magnet 56 and the sleeve 71 of paramagnetic material, which completes the magnetic circuit; and the direction of rotation of these two is indicated by the arrow 161. The dotted lines and arrows 162 indicate the approximate path of magnetic lines of flux and show the flux path extending through the magnet and completing the circuit by means of the paramagnetic sleeve 71 on both sides of the magnet.

The copper sleeve forming armature 81 is shown adjacent the magnet, but axially removed therefrom; and the dotted squares 163 in the top and bottom of the sleeve 81 show the approximate area of the ends of the magnetic poles; and the dotted lines and arrows in the copper sleeve 81, indicated at 164 and 165, show the approximate path of eddy currents induced in the copper sleeve in the areas adjacent the poles of the magnet.

The operation of the tachometer is as follows. When the shaft 44 of the tachometer is rotated by another shaft, the speed of which is to be measured, the magnet 56 and soft iron sleeve 71 surrounding it rotate at the speed of the shaft; and the movement of the magnetic flux relative to the copper sleeve 81 induces eddy currents in the copper sleeve.

These eddy currents produce their own magnetic field surrounding each line current according to the right hand rule, producing lines of magnetic flux which coact with the flux from the magnet and produce a force tending to rotate the copper sleeve.

The torque due to the eddy currents is proportional to the speed of rotation of the magnetic circuit structure; and it is resisted by the spring 35 with a spring torque which is proportional to the angular deflection of the spring.

The position of the potentiometer contact 112 is proportional to the speed of rotation of the magnetic circuit structure.

As a constant voltage is applied across the potentiometer, the voltage between contact 112 and terminal 93 of the potentiometer is proportional to the speed of the driving shaft; and the pointer 140 of the direct current galvanometer will indicate on the scale 141 the speed in revolutions per minute.

The electrical resistance of the armature sleeve or the spring torque may be suitably adjusted and calibrated so that the heating effect is reduced to a minimum.

As the rotating armature is mounted on ball bearings, the static resistance is reduced to a minimum and frictional losses may be reduced.

It will thus be observed that I have invented an improved eddy current tachometer which includes a minimum number of parts and which is adapted to indicate accurately the rotational speed of a shaft to be measured.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described by invention, what I claim as new and desire to secure by Letters Patent of the United States is:

1. An eddy current tachometer indicator assembly for indicating revolutions per minute, having a minimum starting and operating torque, comprising a direct current galvanometer indicating instrument having a pointer actuated by a direct current coil along a scale calibrated in revolutions per minute, a potentiometer comprising a resistance wire of simple circular form carried by a fixed insulating disc on the periphery thereof, and having its terminals connected to a direct current energizing circuit, said galvanometer coil having one terminal connected to one end of said resistance wire and the other terminal of the galvanometer being connected to a contact, having sliding engagement with said resistance wire, a tachometer body comprising a fixed cylindrical housing having a bearing sleeve carried by one end of said body and extending axially from said body, a first shaft rotatably mounted in said sleeve and projecting therefrom to be driven by a rotating shaft, the rotating speed of which is to be indicated, a magnet clamp carried by the inner end of said shaft and comprising a non-magnetic cylindrical body having a rectangular slot recess extending axially into said body for receiving a complementary rectangular magnet block, a magnet assembly comprising a rectangular magnetic block of paramagnetic material of high coercive force, polarized transversely to said slot in said clamp and fitting in said slot, and said magnetic block being provided with a pair of partially cylindrical soft iron pole shoes secured to the polarized ends of said magnet and forming with the magnet and clamp, a cylindrical magnet and clamp assembly, an end plate secured to said magnet clamp about said first shaft, said end plate supporting an axially extending cylindrical pole shoe of paramagnetic material, concentrically to the outer cylindrical surface of said magnet and clamp assembly, forming a cylindrical air gap, a partition in said housing and having a second bearing aligned with said first shaft, a second shaft in said second bearing and supporting on its inner end, a cylindrical armature sleeve of non-magnetic metal, rotatably mounted in said air gap by said second shaft, an insulating contact block carried by said second shaft and supporting said contact in sliding engagement with said resistance wire, a spring connecting said second shaft and said insulating disc which supports said resistance wire for resisting rotative movement of said second shaft and urging said armature sleeve to a zero position of said sliding contact, the rotation of said first shaft rotating the magnet and clamp assembly and the armature sleeve with the flux generated by said magnet in said air gap, the lines of flux rotating with said magnet and armature sleeve and the lines of flux cutting longitudinal lines of conductivity in said armature sleeve and inducing eddy currents in said armature sleeve, which cutting produces magnetic flux in the air gap, coacting with the rotating flux of the magnet and tends to rotate the armature sleeve, the sliding contact taking a position proportional to the speed of rotation of the first shaft, and the pointer indicating the corresponding speed in revolutions per minute on the scale.

2. An eddy current tachometer indicator assembly according to claim 1, in which the potentiometer is energized by a circuit including an A.C. transformer connected to a standard A.C. 60 cycle lighting circuit and having its secondary connected to a rectifier bridge, the output of the bridge being connected to a condenser, absorbing alternating components, and to a ballast resistance and a diode, bridged across the potentiometer to reduce the output voltage impressed upon it and to impress a constant voltage on the potentiometer terminals.

References Cited in the file of this patent

UNITED STATES PATENTS

| | | |
|---|---|---|
| 2,127,847 | Schulte | Aug. 23, 1938 |
| 2,159,389 | Fevre | May 23, 1939 |
| 2,950,420 | Hastings | Aug. 23, 1960 |